United States Patent [19]

Kest et al.

[11] 3,932,558

[45] *Jan. 13, 1976

[54] HEAT SEALABLE ADHESIVE PRODUCT AND METHOD OF MAKING THE SAME

[76] Inventors: Donald O. Kest, 6258 Fairhaven Road, Mayfield Heights, Ohio 44124; John M. Questel, 2829 Lakeland Parkway, Cuyahoga Falls, Ohio 44221

[ * ] Notice: The portion of the term of this patent subsequent to July 3, 1990, has been disclaimed.

[22] Filed: July 2, 1973

[21] Appl. No.: 375,457

[52] U.S. Cl. .................. 260/841; 156/335; 156/79; 156/338; 260/27 BB; 260/77.5 CR; 427/55; 427/158; 427/177; 427/207; 427/379; 427/385; 428/355
[51] Int. Cl.$^2$......................................... C08L 63/00
[58] Field of Search .. 161/190; 117/161 A, 161 KP, 117/161 UD; 260/27 BB, 77.5 CR, 47 UA, 841; 156/335, 338, 77; 428/355

[56] References Cited
UNITED STATES PATENTS 3,308,170   3/1967   Pritchett et al............. 260/77.5 CR
3,743,616   7/1973   Kest................................... 156/230

Primary Examiner—Edward G. Whitby
Attorney, Agent, or Firm—Freeman & Taylor

[57] ABSTRACT

An elastomer-based heat sealable adhesive composition and method of making the same having an improved balance of physical and chemical properties including improved peel adhesion, tack, and creep resistant characteristics, together with the capability to selectively vary such characteristics. The composition is adapted for formation in situ on a substrate by the chemical formation of an elastomer base material in the presence of a compatible resin material. The elastomer material comprises the reactive product of a reactive component and a coreactive component with the reactive component, including a liquid diene telechelic polymer material and with the coreactive component including an organic coreactive material which is capable of reacting with the diene telechelic polymer material.

13 Claims, No Drawings

HEAT SEALABLE ADHESIVE PRODUCT AND METHOD OF MAKING THE SAME

BACKGROUND OF THE INVENTION

This invention relates generally to a new class of and method for producing heat sealable adhesives. More particularly, this invention encompasses a method of producing a new class of heat sealable adhesive product by the in situ formation of a solid, elastomeric polymer derived from the reaction of a low-molecular weight, diene telechelic polymer having functional groups and a coreactive organic compound having groups coreactive with the polymer functional groups in the presence of particular types and quantities of compatible resins, which products have a spectrum of properties unattainable with heat sealable adhesives presently known and available to the art.

Generally, in the technology of heat sealable adhesives, the physical properties known in the art as tack, peel adhesion, and creep resistance are paramount in determining the suitability of any given heat sealable adhesive composition to provide the necessary application properties and in-service durability required of the heat sealable adhesive product.

Besides these physical property parameters, the chemical attributes of the heat sealable adhesive composition must also be considered in order to provide a heat sealable adhesive product having the requisite durability in the environment in which it is to be used. Thus, for example, the heat sealable adhesive must be formulated so as to exhibit resistance to adhesive-degrading environmental conditions such as elevated temperatures, sunlight, organic solvents, moisture, acids, and bases to which the heat sealable adhesive product will be exposed in service.

This application relates to and comprises a modification of the basic principles of in situ polymerization of liquid elastomers disclosed and claimed in the U.S. Pat. applications to Donald O. Kest, Ser. Nos. 144,293 and 144,337 filed May 17, 1971, now U.S. Pat. Nos. 3,743,616 and 3,743,617.

SUMMARY OF THE INVENTION

An elastomer-based, heat sealable adhesive composition having an improved balance of physical and chemical properties characteristics including improved peel adhesion, tack, and creep resistance characteristics together with the capability to selectively vary such characteristics. The composition being adapted for formation in situ on a substrate by the chemical formation of an elastomer base material in the presence of a resin material and comprising:

I. An elastomer base material which is adapted for chemical formation in situ on said substrate and which comprises the reaction product of:
   A. A reactive component having reactive functionality and which includes a liquid diene telechelic polymer material.
   B. A coreactive component having coreactive functionality capable of reacting with said reactive functionality and which includes an organic coreactant material capable of coreacting with said reactive functionality of said diene telechelic polymer material.
II. A resin material, said resin material being present, by weight, in relation to the elastomer material with ratio of 1:1 to 2:1.

It is the principal object of this invention to provide a new class of heat sealable adhesives that minimize or in some instances eliminate the limitations and deficiencies of presently used heat sealable adhesive compositions and a method for their production that obviates the disadvantages of manufacturing processes currently used to produce heat sealable adhesive products.

More specifically, it is an object of this invention to provide a method of producing heat sealable adhesive products that eliminate or greatly reduce the need for solvents and their attendant disadvantages including pollution of our environment, combustibility, toxicity and increased costs.

A further object of the invention is the provision of a process that, even when some solvents are employed, requires simpler and less expensive heating means, e.g., ovens, to achieve production speeds equal to those normal today for solvent-produced heat sealable adhesives, or conversely, if conventional heating means are used, permits the production of heat sealable adhesive products at faster speeds.

Another object is to provide a process of manufacturing heat sealable adhesive products that reduces the amount of scrap that is generated.

A still further particular object is the provision of heat sealable adhesive compositions, having wide latitude in their ability to provide an overall balance of physical and chemical properties characteristic of those obtained with both nonpolar and polar-type, heat sealable adhesives.

A further object of the present invention is to provide a heat sealable adhesive composition that can be readily adhered to a substrate by heat activation and which is essentially tack free (as cured) at ambient temperature.

DESCRIPTION OF THE PREFERRED EMBODIMENTS

In particular, the hydrocarbon-backbone polymer, hereinafter referred to as the diene telechelic polymer, that is utilized in the practice of this invention, is a liquid or quasi-liquid polymer. Preferably, the polymer is derived from the polymerization of butadiene. Isoprene, piperlyene, chloroprene or mixtures thereof, or copolymers derived from the random copolymerization of butadiene, isoprene, piperlyene, chloroprene or mixtures thereof may be employed with up to 33% by weight of a copolymerizable vinyl monomer (preferably free of active hydrogen groups capable of reacting with an isocyanate), which polymer has a terminal reactive functional group (hereinafter called functional groups), such as a terminal hydroxyl, mercaptan, amino, or carboxyl groups (hereinafter called active hydrogen groups), attached to one of the last three carbon atoms at the end of the polymer chains, and an average of at least about 1.6 of such terminal functional groups, such as active hydrogen groups, per polymer molecule, such functional group is preferably hydroxyl. It is believed that elements such as chlorine, bromine or iodine, or the organic radicals, such as mercaptan, carboxyl, amino, epoxy, aziridino and aldehyde radicals may be employed which, because of their position on the polymer chain and/or their chemical nature can coreact with coreactive functional groups of an organic coreactant, as hereinafter defined, with which it is desired to react the diene telechelic polymer during the in-situ formation of the heat sealable adhesive to form an elastomer-like polymer. Depending on its method of synthesis, it is possible to obtain and use a diene telechelic polymer having a branched structure and thus more than two chains having such terminally located functional groups, such as active hydrogen groups. While diene telechelic polymers having as many as four functional groups, such as four active hydrogen groups, can be used, it is preferred to use polymers having no more than three per polymer molecule to give the desired viscoelastic flow properties.

Further, to provide heat sealable adhesives having the necessary elasticity and compatibility with resins, it is believed the polymer should have an average equivalent weight (molecular weight of the polymer divided by the number of functional groups, such as active hydrogen groups in the polymer) of at least about 500. For maximum compatibility and physical properties, polymers having an average equivalent weight of about 800 or more are preferred. The maximum equivalent weight of polymers that are capable of producing acceptable heat sealable adhesives, as a rule, will not exceed 3,000 and usually 2,000 to 2,500 is the normal upper limit. Bearing in mind the parameters of functionality and suitable equivalent weight, it can be seen that the molecular weight of the diene telomer can vary from a low as about 800 up to a useful maximum of about 12,000.

Generally, when maximum resistance to a solvent environment is desired, diene telechelic polymers having up to about 25% by weight of randomly copolymerized polar monomers such as acrylonitrile; methacrylonitrile or methacrylamide will be used. Heat sealable adhesives having improved sunlight resistance and heat resistance are obtained by using diene telomers containing up to about 33% by weight of randomly copolymerized acrylate esters such as methylmethacrylate and ethyl acrylate. Lower cost and/or modification of heat sealable adhesive properties can be obtained by using diene telechelic polymers containing up to about 33% by weight of randomly copolymerized vinyl aromatic monomers such as styrene, and methyl styrene and vinyl pyridine. As a general rule, however, maximum latitude with regard to formulating with different types of resins to produce a broad spectrum of heat sealable adhesives, as described hereinafter, is obtained when the diene telechelic polymer is derived from monomers consisting essentially of butadiene. It is believed that isoprene, piperlyene or mixtures thereof may be employed. Similarly, while satisfactory heat sealable adhesives may be made with diene telomers having various reactive functional groups, such as mercaptan, amino and carboxyl end groups, more flexibility in formulating heat sealable adhesives having the desired processing characteristics and physical properties may be obtained with diene telomers having hydroxyl end groups and consequently are preferred in the practice of this invention.

It is felt that diene telechelic polymers useful in this invention may contain, in addition to monomer and initiator, divalent radicals of low-molecular-weight coupling compounds which, in some instances, introduce into the diene telechelic polymer chain, groups containing O, S or N atoms such as carbonyl, ether, ester or amide groups. Where they are present, the minimum molecular weight of the diene polymer segment or diene-vinyl copolymer segment between the coupling compound radical preferably is about 500 or more to insure proper adhesive viscoelastic properties and resin compatibility in the heat sealable adhesives of this invention.

There can be employed in this invention, lower-molecular-weight, reactive, chain-extending or cross-linking compounds having a molecular weight usually of about 300 or less and 2 to 4 functional groups, such as hydroxyl.

The hydroxyl groups are preferred for maximum latitude in formulating the invention heat sealable adhesives reactive with the organic coreactant, such as an isocyanate, and generally for best results of the same type as are present in the diene telechelic polymer, so as to have about the same degree of reactivity with the organic coreactant. It is believed that the carboxyl, amino or mercaptan groups may be employed. The preferred compound is N, N-bis (2-hydroxypropyl) aniline. Typical of other extending or crosslinking compounds that may be used either alone or in combination are ethylene glycol, 1,4-butanediol, 1,4-cyclohexane glycol, trimethylol propane, pentaerythritol, adipic acid, succinic acid, terephthalic acid, ethanol amine, piperazine, hydrazine, propylene diamine, 4,4′-methylene bis (2-chloroaniline), 3,3′-dichloro benzidine, 4,4′-diamino-diphenyl methane and 2,4- and 2,6-toluene diamines. When desired, water may be used with an excess of a polyisocyanate to generate a polyamine in situ. The quantity of extenders or crosslinking compounds that may be used cannot be rigidly delineated because it depends not only on the structure, molecular weight and functionality of the extender or crosslinker but also on factors such as the equivalent weight and composition of the diene telechelic polymer and the reactive polyether and polyester, if used, as well as the type and quantity of organic coreactant, such as polyisocyanate, that is employed in producing the invention pressure sensitive adhesives. All of these factors are interdependent in determining whether the polymer produced will have the necessary visoelastic properties required of the heat sealable adhesives of this invention as more fully described hereinafter.

Organic coreactants, such as organic polyisocyanates, that may be used in forming the heat sealable adhesives of this invention include any organic radical having about two or more groups that are capable of coreacting with the functional groups present in the diene telechelic polymers and the functional groups present in the reactive polyether, polyester, extender or crosslinker when such ingredients are present to produce an elastomer-like product in the in-situ-formed heat sealable adhesive of this invention. Further, suitable organic coreactants must be capable of being dissolved or homogeneously dispersed in the diene telechelic polymer and other polymer forming ingredients used. The organic radical of the organic coreactant may be derived from a conventional organic compound having a molecular weight of from about 50 to 300 or may be derived from a polymer having molecular weights up to about 1,000 or even more and may consist only of carbon and hydrogen or may contain in addition other elements such as halogens, oxygen, nitrogen, sulphur and so forth either in the body of the radical or as constituents of groups substituted onto the body of the radical. The organic radical may be alkyl, aryl, cycloalkyl, alkaryl, aralkyl, and so forth. Illustrative of the coreactive groups attached to the organic radical of the organic reactant that may be used are bromine, chlorine, iodine, amino (primary, secondary or tertiary), epoxy, axiridinyl), isocyanate, aldehyde, hydroxyl, carboxyl and mercaptan. Typical organic coreactants that may be used are aromatic, aliphatic and cycloaliphatic isocyanates (as for example, 2, 4 toluene diisocyanate, 2,6-toluene diisocyanate, p-phenylene diisocyanate, 4',4' biphenylene diisocyanate, p,p' methylene diphenyl diisocyanate, polymethylene polyphenylisocyanage, triphenylmethane tri-isocyanate, hexamethylene diisocyanate and methylene dicyclohexyl-4,4'-diisocyanate. In the practice of the invention, sufficient organic coreactant, such as polyisocyanate, is used to provide a ratio of coreactant groups (such as isocyanate groups) to the total of the functional groups (such as active hydrogen groups) present in the diene telechelic polymer, and when used, the reactive polyester or polyether and extending or cross-linking compound of from about .8 to 1.40. Normally, ratios between about 0.95 and 1.20 are preferred for most heat sealable adhesive applications to provide an optimum balance of properties. A ratio of less than about 0.95 usually produces heat sealable adhesives that have poorer cohesive strength, poorer creep resistance, increased tendency to transfer from the substrate web to the adhered surface, and finally, increased sensitivity to environmental degradation. Conversely, when the ratio exceeds more than about 1.40, the invention heat sealable adhesives have, in many instances, been observed to exhibit poor tack and peel adhesion at low temperatures (e.g. 40°F or less) and to be incapable of giving good adhesion to rough surfaces due, it is believed, to reduced visoelastic flow properties.

It has been discovered that acceptable heat sealable adhesives within the scope of this invention can only be produced when at least about 100 to 200 parts of a resin or mixture of resins, having the particular characteristics hereinafter described, are employed per 100 parts of the polymer formed by the in-situ coreaction of the organic coreactant with the diene telechelic polymer and, when utilized, the reactive polyester, polyether, extender and cross-linking compound or a ratio of between about 1:1 to 2:1.

To provide the heat sealable adhesives of this invention having an improved balance of tack, peel adhesion and creep resistance, it is necessary that virtually all of the resin or mixture of resin employed be soluble in the diene telechelic polymer or when reactive polyether or polyester are used in their admixture with the diene telechelic polymer to give solutions that are essentially haze-free after being conditioned 24 hours at 25°C. In making this solubility determination, the temperature of the diene telechelic polymer or its admixture with the reactive polyether or polyester can be raised, e.g., to 160°–200°F, to facilitate the solvation of the resins after which the temperature is lowered to 25°C for the 24-hour period of conditioning. Additionally, to provide the necessary heat sealable adhesive properties, the resin or mixture of resins used should have a ball and ring softening point of between about 60°C and 140°C. A preferred resin for this purpose is a phenolic novalak resin. For example, AROFENE, a trademark produce of Ashland Chemicals has been employed. Representative of other resins which may be used are rosin, hydrogenated rosin, polymerized rosin, pentaerythritol ester of rosin, pentaerythritol ester of hydrogenated rosin, glycerol ester of hydrogenated rosin, glycerol ester of polymerized rosin, phenol-modified pentaerythritol ester of rosin, maleic anhydride-modified rosin and rosin derivatives, oil-soluble phenol-aldehyde resins, terpene phenolic resins, polymerized pinenes and polymerized C$_5$ hydrocarbon resins. When it is desired to produce heat sealable adhesives having adhesion to polar surfaces, the invention heat sealable adhesives should be principally formulated with one or more resins having somewhat of a polar character such as rosin, the rosin derivative resins, and the phenol-containing resins. Conversely, when adhesion to non-polar substrates is required, then the major portion of the resins may be one or more of the nonpolar types such as the polymerized pinenes and the polymerized hydrocarbon resins. Generally, it is observed that both the nonpolar and the somewhat polar resins are compatible to the desired extent in the diene telechelic homopolymers and in the diene telechelic copolymers made with only slightly polar vinyl monomers such as the vinyl aryls and the arcylate esters. While the upper limit of resin cannot be precisely delineated, in most adhesive formulations, not more than about 200 parts per 100 parts of the in-situ formed heat sealable adhesive polymer will be utilized.

In the process of this invention, a catalyst may be used to accelerate the in-situ formation of the heat sealable adhesive on the substrate web or the formation of an intermediate prepol, as discussed hereinafter. Usually about 0.5 to 1.0 parts, per 100 parts of the total elastomer precursor reactants, of a cataylst chosen to catalyze the particular coreaction being employed to form the invention heat sealable adhesive in situ (such as dibutyl tin dilurate, dibutyl tin diacetate stannous octoate, dimethyl-aniline for isocyanates) will provide the desired increase in the coreaction of the organic coreactant, such as a polyisocyanate, with the telechelic diene polymer and, if used, the reactive polyether or polyester, extender and cross-linking compound.

To facilitate the admixing of the heat sealable adhesive ingredients and its subsequent application to the substrate web, there may be used a minor quantity of an organic solvent capable of solvating all the heat sealable adhesive ingredients. Especially useful are such polar-like solvents as toluene, xylene, methyl isobutyl ketone, methyl ethyl ketone and butyl acetate. In some cases, it is possible to substitute for the polar-like solvents used up to about 50 percent by weight of a nonpolar solvent such as heptane, hexane, and napthalene. Besides reducing viscosity, the solvent is of further benefit in increasing the pot life of the admixed pressure sensitive adhesive ingredients, thus permitting more flexibility in factory processing operations.

An especially unique and valuable embodiment of this invention resides in the use of up to about 90 parts, per 100 parts of the in situ formed heat sealable adhesive elastomer of a diene elastomer, which is compatible therewith, in the pressure heat sealable composition to accelerate the solidification of the heat sealable adhesive after it has been applied to the substrate web. Particularly effective are the styrene-type segments terminally located.

Other diene elastomers that may be used are natural rubber, polyisoprene and polychloroprene (neoprene), random copolymers of styrene and butadiene having a mooney viscosity of about 35 to 90 (ML-4'-212°F). When at least about 15 parts and preferably from about 25 to 60 parts of such diene elastomers are utilized, it is possible to wind up the substrate web into a roll, after the heat sealable adhesive has been cast on the web and the solvent essentially all removed, where the balance of the in-situ formation of the heat sealable adhesive elastomer can occur during storage on the roll at ambient temperatures without the adhesive layer flowing to give uneven adhesive thickness and hoop-stress lines caused by the ever present variation in wind-up torque. A further valuable contribution imparted by the presence of the diene elastomer in this embodiment of the invention heat sealable adhesive is that it markedly reduces the sensitivity of the composition to impurities present in the ingredients, such as water, which adversely affect the active functional group/coreactive group stoichiometry (such as active hydrogen group isocyanate stoichiometry), thereby permitting the day-in and day-out factory production of heat sealable adhesive products having uniform and consistent properties. When diene elastomers are used, the quantity of resins should be increased. In the case of the block-type diene elastomer, it is increased an amount such that the ratio of the resin to elastomer (i.e., the total of the diene elastomer and the in-situ-formed elastomer) is approximately the same as would be used in its absence to give the desired adhesive properties. When a diene elastomer homopolymer or random copolymer is used, sufficient additional resin is used so that the ratio of added resin to the diene elastomer is at least 0.6.

In addition to the above described ingredients, other adjuvent materials, commonly utilized in heat sealable adhesive compositions, may be employed in essenaitlly the same manner in the heat sealable adhesive of this invention, such as anti-degradents, UV-stabilizers, optical whiteners, color pigments and dyes, adhesion promoters, reinforcing pigments and filler pigments, to impart their special properties as is well-known to those skilled in the adhesive arts.

In the practice of the invention process, the ingredients of the heat sealable adhesive may be combined and admixed by any means that provides a final homogenous liquid admixture and further provides sufficient time to transport the liquid admixture from the admixing means to the casting means and its subsequent casting unto the substrate web before any appreciable thickening or solidification occurs. Bearing in mind these requirements, it is necessary in preparing the heat sealable adhesive products of this invention to first dissolve all solid ingredients that are soluble, such as resin, diene elastomer, anti-degradant, extender or cross-linking agent, and homogenously predisperse any solid ingredients such as color pigment, reinforcing pigment or filler pigment into part or all of the diene telechelic polymer and/or the reactive polyether, polyester or solvents if present. When a diene elastomer is employed, some or all of the solid insoluble ingredients may advantageously be predispersed in it on rubber mixing equipment such as a Banbury or rubber mill, prior to solvating it. After the presolvation and predispersion of the solid ingredients, any remaining liquid ingredients and the organic coreactant (such as an organic polyisocyanate) are added either incrementally or in one addition and homogenously dispersed. In some heat sealable adhesive compositions of this invention, a stoichiometric excess of the organic coreactant can be first added to and permitted to react with a part of the total diene telechelic polymer to form an organic coreactant prepol which minimizes any coreactant toxicity and facilitates handling, proportioning and subsequent admixing in factory processing operations and is consequently a preferred mode of practicing the invention process. When a stoichiometric excess of organic polyisocyanate is first added to and permitted to react with a part of the total diene telechelic polymer and/or reactive polyether or polyester, if present, then an isocyanate prepol is formed which minimizes isocyanatetoxicity and facilitates handling, proportioning and subsequent admixing in factory processing operations and is consequently a preferred mode of practicing the invention process. Alternatively, when these benefits are not required, then all of the ingredients after presolvation and predispersion of the solid ingredients may be admixed at one time employing the "one-shot" process to form the final heat sealable adhesive composition. As will be known to those skilled in the art, when extremely reactive extenders or cross-linking agents or "hot" catalysts are employed, they are desirably added last to ensure a satisfactory admixing of the other ingredients.

After all of the ingredients of the invention heat sealable adhesive composition have been homogenously admixed, the liquid admixture is applied to a substrate web which could be paper, plastic film, metal foil, by any conventional casting means that is capable of metering and applying the desired thickness uniformly across the web such as a wire-wound rod, a knife coater, a reverse roll coater and so forth. If solvents are present, the coated substrate web is then desirably heated to accelerate solvent removal and initiate the in-situ formation of the solid heat sealable adhesive by heating means such as a circulating hot air oven, infrared heaters or heated drums. The coated web is then wound up on a storage roll where the in-situ formation of the invention heat sealable adhesive occurs within a few hours at elevated storage temperature (e.g., 120° to 180°F) or within one to seven days at ambient temperatures depending upon the reaction kinetics of the particular formulation being used. When solvent is not present, then heating prior to windup of the web is optional depending on the nature of the substrate web, the heat sealable adhesive formulation and the desired end product. For webs and formulations subject to considerable hoop stress variations in the roll, which can cause visable adhesive layer thickness variations, then the heat sealable adhesive layer should be partially set up or solidified by a prewind-up heating to an extent that will prevent any appreciable flow of the adhesive layer and the consequent introduction of hoop stress lines in the product during storage on the roll.

The finished coated web is essentially tack-free and may have a shelf-life of from 4 to 6 months. In use, the composition is heat activated at a temperature between about 225°F to 300°F to provide molten flow to wet the surface of the article to which it is to be applied. After heat activation, the composition is cooled down to below about 200°F to provide a thermoplastic, solid heat seal or bond with the surface to which it is applied.

Because, at most, only a minor quantity of the total elastomer in the heat sealable adhesive compositions of this invention is provided by a solid elastomer, viz. a maximum of 90 parts of the diene elastomer per 100 parts of the in-situ formed elastomer, and further because of the limited solvent may be employed, viz. about 45% or less solvent by weight of the liquid heat sealable adhesive composition being cast, it is possible to dry the liquid heat sealable adhesive composition, after casting on the substrate web when solvent is present, considerably faster than conventional heat sealable adhesives based entirely on a solid elastomer, free of voids and bubbles. As a consequence of this property, the heat sealable adhesives of this invention may be dried with shorter length heating means, or conversely, if conventional heating means are used, more rapidly.

In the following example, there is set forth various embodiments of the heat sealable adhesive and method of sealing the same of the invention, all parts by weight, as follows:

EXAMPLE I

The composition was prepared by homogenously admixing Part A comprising generally the diene telechelic polymer and the resin, with Part B, the organic coreactant. In such case, Part A was made by predissolving the resin in the diene telechelic polymer and then adding and homogenously dispersing the balance of the ingredients. Specifically, Part A was prepared by admixing 100 pounds of neoprene, 400 pounds of methyl ethyl ketone and 80 pounds of toluene and stirring the same (e.g. on Katy Mill) until dissolved. To this admixture was added 200 pounds of phenolic novalak resin (AROFENE 8318, TRADEMARK of Ashland Chemicals) by stirring until dissolved. Then 100 pounds of hydroxyl-terminated polybutadiene (Poly BD R-45HT), 2.35 pounds of N, N-bis (2 hydroxypropyl) aniline (ISONOL C-100, a TRADEMARK of Upjohn Company), 4 pounds of a resin antioxidant (WINGSTAYL, a TRADEMARK of Goodyear Chemicals Company) and 0.5 pounds of dibutyl tin diacetate (catalyst) was stirred in for a period of 15 minutes, all at ambient temperature. Part B, including 14.1 parts of polymethylene, polyphenyl isocyanate (ISONATE 901, a TRADEMARK of Upjohn Company) was added to Part A to activate the same to give the heat sealable composition for in-situ formation on a substrate. In this case, the ratio of A to B was 63 : 1, by weight.

EXAMPLE II

The organic polyisocyanate of Part B was prereacted with part of the telechelic polymer prior to mixing Parts A and B. Specifically, 100 pounds of methyl ethyl ketone and 200 pounds of phenolic novalak resin (AROPENE 8318) was admixed by stirring until dissolved. Then 100 pounds of hydroxyl-terminated polybutadiene (Poly BDR-45 HT) was added by stirring for 5 minutes. To this admixture was then added 2.4 pounds of N, N-bis (2 hydroxypropyl) aniline (ISONOL C-100) 2.0 pounds of antioxidant (WINGSTAYL) and 1.0 pound of dibutyl tin diacetate (catalyst) to give Part A.

Part B was prepared by admixing 27.0 pounds of toluene, 78.0 pounds of methyl ethyl ketone and 40.0 pounds of solution - polymerized random 52/48 copolymer of butadiene/styrene (SOLPRENE 303, a TRADEMARK of Phillips Petroleum Company) by mixing on a Katy Mill overnight. This admixture was then prereacted with 17.0 pounds of polymethylene polyphenyl isocyanate (ISONATE 901) by stirring for 20 minutes to give Part B for admixture with Part A in a ratio of A to B of 2.5:1 by weight.

The pressure heat sealable composition of the present invention achieves its final properties of a viscoelastic, thermoplastic adhesive mass by the controlled chain extension, branching, and cross linking of certain reactive group terminated elastomers with curatives in the presence of a high concentration of compatible resins. By controlling chain extension, cross linking, branching, resin composition, resin concentration, other additives, and other features, the formulator has at his disposal sufficient sophisticated controls to enable him to tailor this system to many diversified applications that require special properties with respect to specific adhesion, peel, creep, tack and other functional characteristics.

From the foregoing description and examples, it can be seen that this invention provides the adhesive technologist with a unique new class of heat sealable adhesives that is essentially tack-free, as cured, at ambient temperature and which is capable of providing a spectrum of properties previously unattainable with the compositions known to the prior art. Particularly unique and valuable is the capability of the invention to provide heat sealable adhesives having a desirable balance of properties for a wide variety of applications that, depending on its formulation, adhere to either polar or non-polar surfaces, having low to high peel adhesion all with superior creep resistance, and exhibiting these properties over a wide temperature range and under a variety of potentially degrading environmental conditions.

Further, it has been demonstrated that the heat sealable adhesives of this invention permit the use of production processes that minimize and in some cases obviate the problems and disadvantages of prior processes. Even when solvent is used in the process of this invention, it has been shown that half or less of the quantity customarily employed will normally be required. Additionally, it has been shown that, because more than half of the film former in the invention, heat sealable adhesive are low-molecular-weight materials at the time of solvent removal, solvent evaporation rates can be many times faster thus minimizing the length and cost of solvent removable means and at the same time, because of the reduced length of the solvent removing means, dramatically reducing the production of off-spec products.

We claim:

1. An elastomer-based, heat sealable adhesive composition which is essentially tack-free, as cured, and having an improved balance of physical and chemical properties characteristics including improved peel adhesion, tack and creep resistance characteristics together with the capability to selectively vary such characteristics adapted for formation in situ on a substrate by the chemical formation of an elastomer base material in the presence of a compatible resin material comprising,
    I. An elastomer base material which is adapted for chemical formation in situ on said substrate and which comprises the reaction product of:
        A. a reactive component having reactive functionality and which includes a liquid diene telechelic polymer material,
        B. a coreactive component having coreactive functionality capable of reacting with said reactive functionality and which includes an organic coreactant material capable of coreacting with said reactive functionality of said diene telechelic polymer material, in the presence of
    II. A compatible resin material, said resin material being present in the amount of at least about 100 to 200 parts by weight of resin material per 100 parts by weight of elastomer material.

2. An adhesive composition according to claim 1, wherein
    said liquid diene telechelic polymer material has an average of at least 1.6 terminal, reactive functional groups per polymer molecule, and each of said terminal functional groups being attached to one of the last three carbon atoms at an end of the polymer molecule.

3. An adhesive composition according to claim 1, wherein
said coreactant organic material has an average number of coreactive functional groups greater than one, and
said coreactive functional groups being reactive with the reactive functional groups of the diene telechelic polymer material so as to increase the average molecular weight and modify the molecular structure of the diene telechelic polymer material.

4. An adhesive composition according to claim 3, wherein
the ratio of the coreactive functional groups to reactive functional groups is in the range from about 1 to about 1.40.

5. An adhesive composition according to claim 1, wherein
said resin material is sufficiently compatible with said elastomer material so that said resin material is soluble in said reactive component at 25°C.

6. An adhesive composition according to claim 1, wherein
said elastomer base material comprises the reactive product of:
A. an isocyanate-reactive component having an isocyanate-reactive functionality and which includes a liquid diene telechelic polymer material, and
B. a coreactive component having an isocyanate functionality including an organic polyisocyanate material capable of reacting with said isocyanate-reactive functional groups of said diene telechelic polymer material, and in the presence of said resin material.

7. An adhesive composition according to claim 6, wherein
said liquid diene telechelic polymer material has an average of at least about 1.6 terminal, isocyanate-reactive functional groups per polymer molecule, and
each of said terminal functional groups being attached to one of the last three carbon atoms at an end of the polymer molecule.

8. An adhesive composition according to claim 6, wherein
said polyisocyanate material has an average number of isocyanate functional groups greater than one, and
said isocyanate functional groups being reactive with the isocyanate functional groups being reactive with the isocyanate-reactive functional groups of the diene telechelic polymer material to increase the average molecular weight and modify the molecular structure of the diene telechelic polymer material.

9. An elastomer-based, heat sealable adhesive composition which is essentially tack-free, as cured, and having an improved balance of physical and chemical properties characteristics including improved peel adhesion, tack and creep resistance characteristics together with the capability to selectively vary such characteristics adapted for formation in situ on a substrate by the chemical formation of an elastomer base material in the presence of a compatible resin material comprising,
I. An elastomer base material which is adapted for chemical formation in situ on said substrate and which comprises the reaction product of:
A. a reactive component having reactive functionality and which includes a liquid diene telechelic polymer material, said reactive component including a compatible diene elastomer material selected from the group comprising styrene terminally located, rubber, polyisoprene, polychloroprene, and random copolymers of styrene and butadiene.
B. a coreactive component having coreactive functionality capable of reacting with said reactive functionality and which includes an organic coreactant material capable of coreacting with said reactive functionality of said diene telechelic polymer material, in the presence of
II. A compatible resin material, said resin material being present in the amount of at least about 100 to 200 parts by weight of resin material per 100 parts by weight of elastomer material.

10. An adhesive composition according to claim 9, wherein
said random copolymers of styrene and butadiene have a Mooney viscosity of about 35 to 90.

11. An adhesive composition according to claim 9, wherein
said diene elastomer material is present in the range between 15 parts to 16 parts per 100 parts of said in situ formed heat sealable adhesive composition.

12. An adhesive composition according to claim 9, wherein
said resin material has a ball and ring softening point of between about 50°C and 140°C.

13. An adhesive composition according to claim 1, wherein
said composition has a shelf-life from 4 to 6 months and is heat activated in use at a temperature between about 225°F to 300°F.

* * * * *